US012640544B2

(12) United States Patent (10) Patent No.: US 12,640,544 B2
Gretz (45) Date of Patent: May 26, 2026

(54) POP-UP COVER AND BOX KIT FOR FLOORS AND COUNTERTOPS

(71) Applicant: arlington industries, inc., Scranton, PA (US)

(72) Inventor: Thomas J Gretz, Delray Beach, FL (US)

(73) Assignee: ARLINGTON INDSUTRIES, INC., Scranton, PA (US)

( * ) Notice: Subject to any disclaimer, the term of this patent is extended or adjusted under 35 U.S.C. 154(b) by 119 days.

(21) Appl. No.: 18/435,896

(22) Filed: Feb. 7, 2024

(65) Prior Publication Data

US 2025/0253630 A1 Aug. 7, 2025

Related U.S. Application Data

(60) Provisional application No. 63/430,758, filed on Dec. 7, 2022.

(51) Int. Cl.
| | |
|---|---|
| *H02G 3/08* | (2006.01) |
| *E05C 1/12* | (2006.01) |
| *E05F 1/10* | (2006.01) |
| *H02G 3/18* | (2006.01) |

(52) U.S. Cl.
CPC .............. *H02G 3/081* (2013.01); *E05C 1/12* (2013.01); *E05F 1/1008* (2013.01); *H02G 3/185* (2013.01)

(58) Field of Classification Search
CPC .......... H02G 3/08; H02G 3/081; H02G 3/185; H02G 3/18; H02G 3/10; H02G 3/12; H02G 3/121; H02G 3/16; H02G 3/126; H05K 5/00; H05K 5/02; H05K 5/0217; H05K 5/0247; H01H 9/02; H01H 9/0207; H01R 13/46
USPC ........................ 174/480, 481, 50, 53, 57, 58; 220/3.2–3.8, 4.02; 248/906
See application file for complete search history.

(56) References Cited

U.S. PATENT DOCUMENTS

| | | | | | |
|---|---|---|---|---|---|
| 4,984,982 | A | * | 1/1991 | Brownlie | ............. G02B 6/4451 |
| | | | | | 292/DIG. 31 |
| 5,023,396 | A | * | 6/1991 | Bartee | .................... H02G 3/185 |
| | | | | | 439/131 |
| 5,575,668 | A | * | 11/1996 | Timmerman | .......... A47B 21/06 |
| | | | | | 439/131 |
| 6,046,405 | A | * | 4/2000 | Obermann | ............. H02G 3/185 |
| | | | | | 220/241 |
| 6,290,518 | B1 | * | 9/2001 | Byrne | .................... H02G 3/185 |
| | | | | | 174/67 |

(Continued)

*Primary Examiner* — Angel R Estrada

(57) ABSTRACT

A pop-up cover with a front insertable outlet. The pop-up cover includes sidewalls, a front panel, an outlet bracket, a lid defining a cavity within the cover, and an opening into the cavity. An outlet bracket enables straight-in insertion and securement of an electrical outlet within the cavity. A cover biasing and latching arrangement enables movement of the pop-up cover from a closed position to an open position. A recessed wall with an aperture on the cover enables easy replacement of the electrical outlet when needed. The cover biasing arrangement includes a pivot pin and a spring on the pivot pin biasing the cover to the open position. A thumb slide enables releasing the cover from the closed position to the open position. An alignment tab on the recessed wall enables rapid alignment and fitting of the outlet bracket to the pop-up cover.

6 Claims, 6 Drawing Sheets

(56) References Cited

U.S. PATENT DOCUMENTS

| | | | | |
|---|---|---|---|---|
| 6,979,209 B2 * | 12/2005 | Griepentrog | H01R 13/447 | |
| | | | | 439/131 |
| 8,097,805 B2 * | 1/2012 | Drane | H02G 3/185 | |
| | | | | 439/535 |
| 8,287,292 B2 * | 10/2012 | Byrne | H02G 3/185 | |
| | | | | 439/535 |
| 8,295,036 B2 * | 10/2012 | Byrne | H01R 25/003 | |
| | | | | 174/67 |
| 8,901,419 B2 * | 12/2014 | Galasso | H01R 13/4536 | |
| | | | | 439/142 |
| 8,944,266 B2 * | 2/2015 | Roemer | H02G 3/185 | |
| | | | | 174/76 |
| 9,614,336 B2 * | 4/2017 | Los | H01R 13/44 | |
| 10,103,533 B1 * | 10/2018 | Gretz | H02G 3/26 | |

* cited by examiner

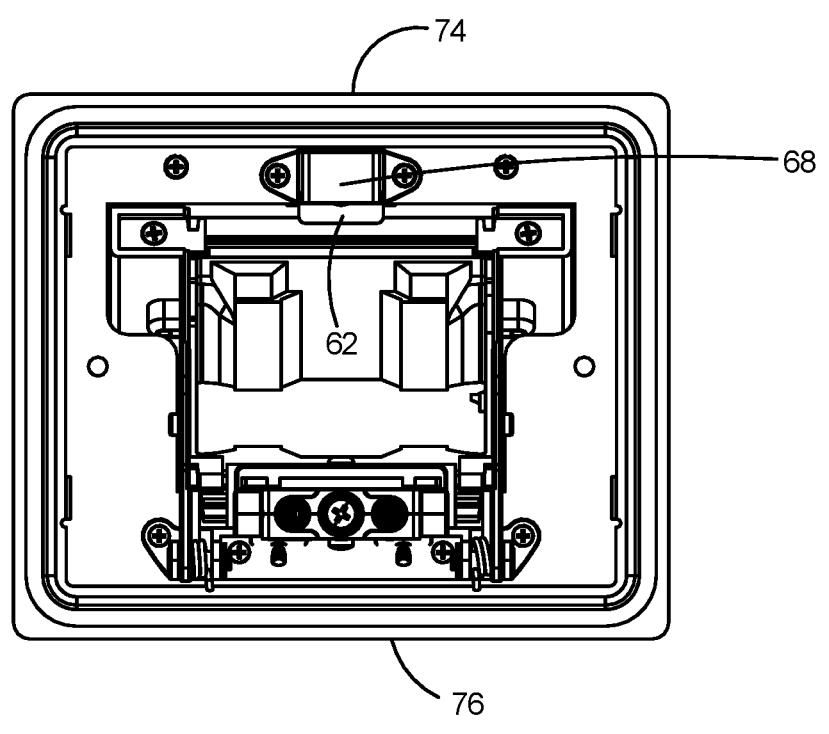
FIG. 7
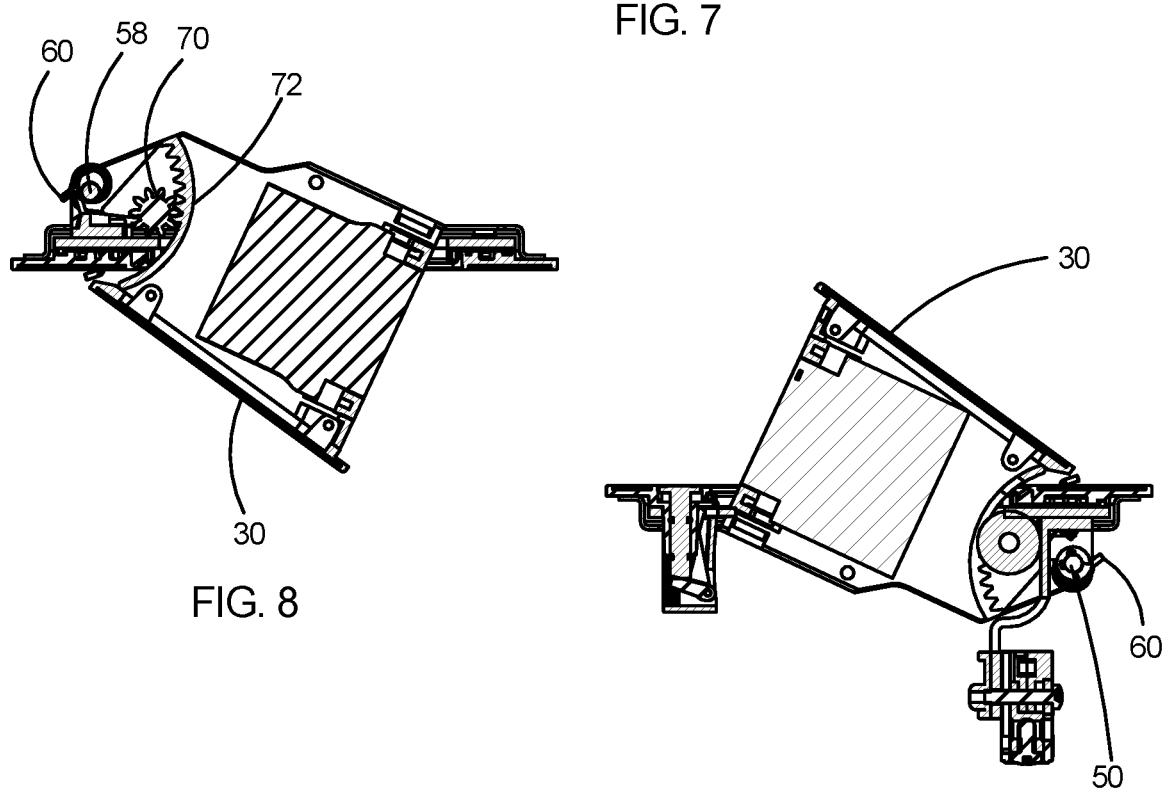
FIG. 8
FIG. 9

POP-UP COVER AND BOX KIT FOR FLOORS AND COUNTERTOPS

CROSS-REFERENCE TO RELATED APPLICATIONS

This application claims the benefit of Provisional U.S. Patent Application Ser. No. 63/430,758 filed Dec. 7, 2022, the contents of which are incorporated herein by reference in their entirety.

FIELD OF THE INVENTION

The present invention generally relates to enclosures for electrical receptacles, and more specifically, to a pop-up cover and box kit with wiring leads extendable through a front opening for easy connection of a receptacle thereto.

BACKGROUND OF THE INVENTION

Installing an electrical receptacle to a conventional floor or countertop box and typically requires disassembly of the cover from the box to access the device wiring. The installer can then retrieve the wiring leads from the line voltage supply and connect it to the receptacle or similar device. Disassembling the box and wiring the device is thus a laborious and time-consuming task. The need to completely disassemble the box and remove it from the floor or other structure requires a substantial amount of time and effort on the part of the installer. Hourly rates for electricians are very high, thereby making the replacement of a receptacle with an updated receptacle a substantial expense on the part of a homeowner.

Accordingly, there is a need for an electrical box and cover to enable easier and less time consuming installment or replacement of electrical components, without requiring removal of the cover and underlying electrical box from the building structure.

BRIEF DESCRIPTION OF THE SEVERAL VIEWS OF THE DRAWING(S)

Reference is made herein to the accompanying drawings, which are not necessarily drawn to scale, and wherein:

FIG. 7 is a bottom view of the pop-up cover.

FIG. 8 is a sectional view of the pop-up cover taken along line 8-8 of FIG. 3.

FIG. 9 is a sectional view of the pop-up cover taken along line 9-9 of FIG. 5.

DETAILED DESCRIPTION

According to the invention, a pop-up cover and box kit simplifies the task of installing an electrical receptacle or other electrical device and gives the installer options for installing a device in a floor or countertop. The device installs from the front. There's no need to dismantle the hinge mechanism. The kit includes a 20 amp receptacle that you can use, or, replace with one of your own. The kit makes it much easier to install the receptacle—from the front. Just remove the white cover plate, install the receptacle and replace the cover plate. The gasketed trapdoor covers close flush with the floor or countertop, preventing damage to the device in the box—and minimizing trip hazards in a floor installation. The kit provides an easy and secure installation. A spring clip holds box securely against the surface when the screws are tightened and fits surfaces in an easy 'no glue' installation. The kit can accommodate a standard rectangular receptacle, a ground fault circuit interrupter (GFCI), or GFCI/combination receptacles. When installed, the pop-up cover and box kit passes the UL scrub water test.

The pop-up cover and box kit gives the installer options for installing a device in a floor or countertop. The pop-up cover kit according to the present invention makes it easy and less time-consuming to install an electrical device in a floor or countertop. The device installs from the front. There's no need to dismantle the hinge mechanism of the conventional electrical box.

Figures 1, 2:
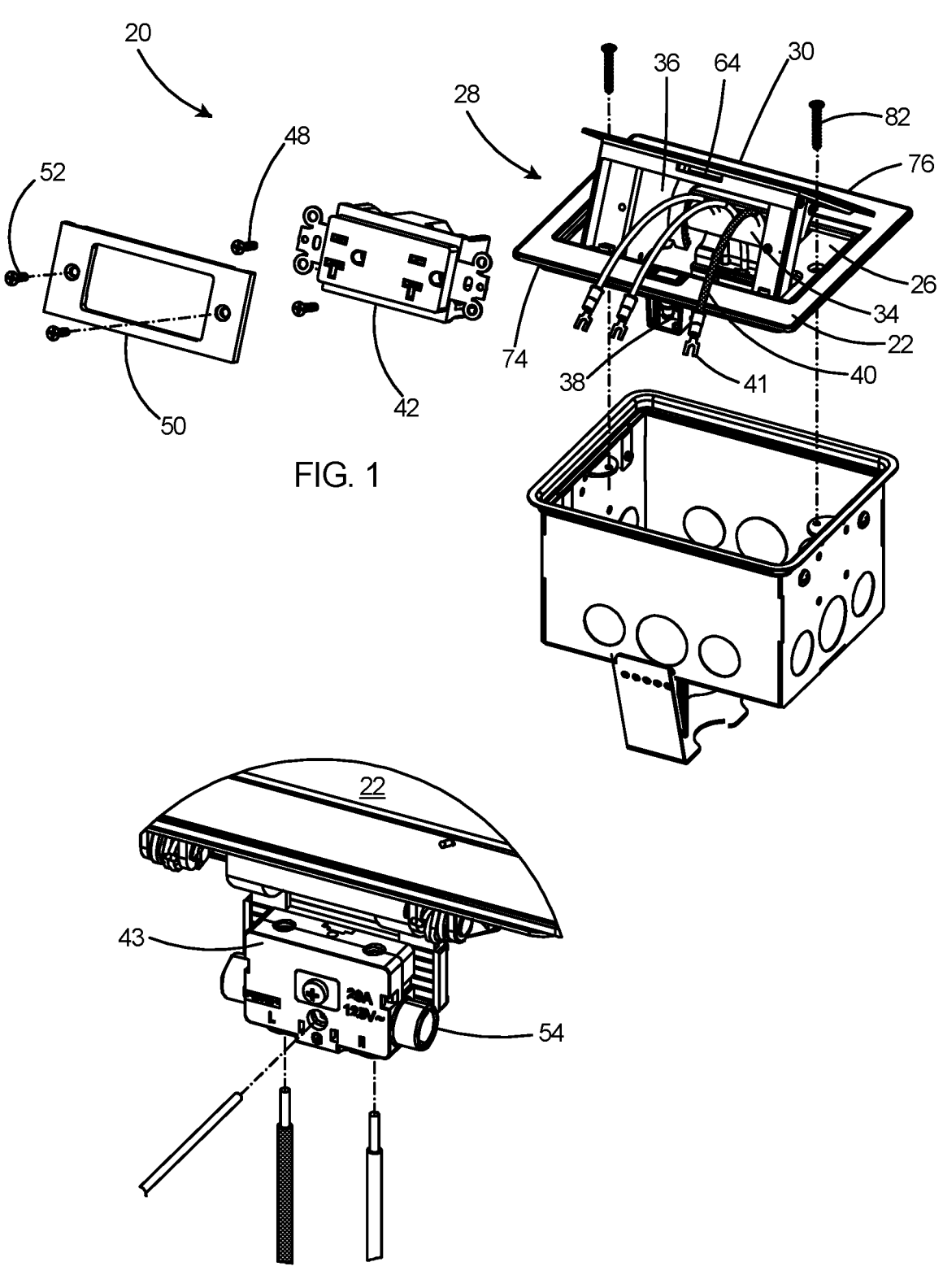
FIG. 1 is an exploded perspective view of a first embodiment of a pop-up cover and box kit for an electrical box according to the invention.
FIG. 2 is a detail view of the terminal block and wiring on the underside of the pop-up cover.

With reference to FIG. 1, the present invention is a pop-up cover 20 for mounting to a conventional steel box. The pop-up cover 20 includes a floor plate 22 with a floor plate opening 24, recessed surface 26, and a pop-up assembly 28 with a lid 30. The pop-up assembly 28 is hinged to the floor plate 22 and may be opened and closed as desired.

The pop-up assembly 28 includes the lid 30 and side plates 32 defining an electrical cavity 34. A front opening 36 provides access to the electrical cavity 34. The floor plate 22 includes a spring clip 38 for opening or closing the pop-up cover 20. When closed, the lid 30 of the pop-up cover 20 is flush with the surrounding floor plate 22 of the pop-up cover 20. A recessed ledge 29 on the periphery of the front opening the pop-up assembly enables flush mounting of a decorator receptacle 42 to the pop-up assembly.

When open, the front opening 36 to the electrical cavity 34 is accessible and wire leads 40, which extend from a terminal block 43 on the underside of the floor plate 22 (see FIG. 2), may be pulled through the front opening 36 to enable an installer to easily connect an electrical component, such as a decorator receptacle 42, to the pop-up cover 20. Each of the wire leads 40 includes a spade clip 41 to facilitate rapid connection to the receptacle 42. The pop-cover provides easy and secure installation to the building's electrical wiring. The spring clip 38 holds the pop up cover 20 securely against the surface when the pop-up cover assembly is closed on the floor plate. An actuator button 66 on the floor plate 22 may be depressed to change the pop-up cover from the closed configuration to the open configuration. The pop-up cover 20 closes flush with floor to prevent water intrusion or damage to the devices in the box. The receptacle 42 is secured to the pop-up cover 20 with screws

48. A receptacle plate 50 is the secured to the receptacle 42 with screws 52 to secure the receptacle within the electrical cavity 34.

Figures 5, 6:
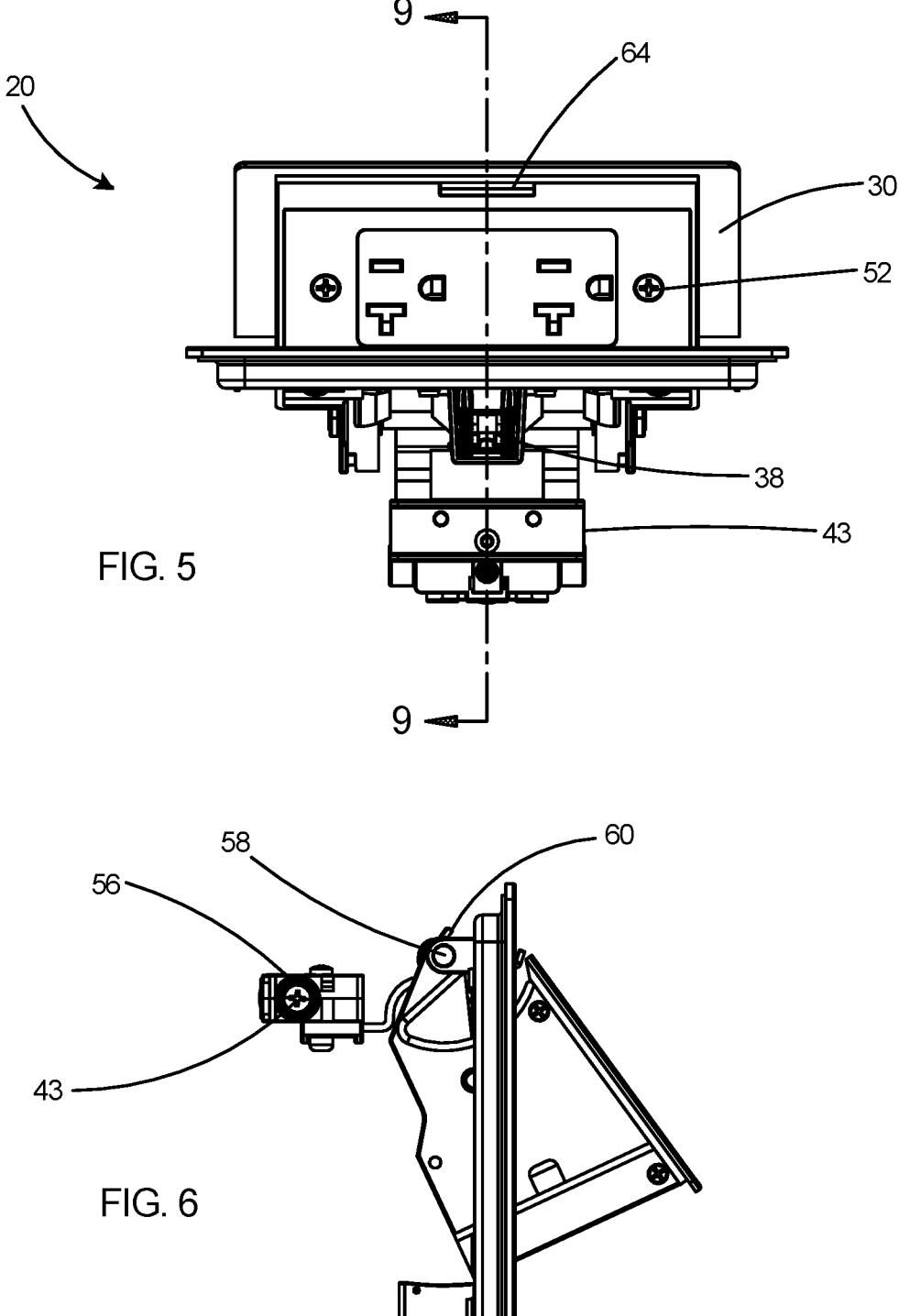
FIG. 5 is a front view of the pop-up cover and box kit.
FIG. 6 is a side view of the pop-up cover, with the cover in the open configuration.

With reference to FIG. 2, the terminal block 43 includes three sockets 54 for accepting straight-in insertion of hot, neutral, and ground wires. Each of the sockets includes a corresponding screw 56 (see FIG. 6), of which one is shown, to facilitate secure connection of the wires in their respective sockets.

Figures 3, 4:
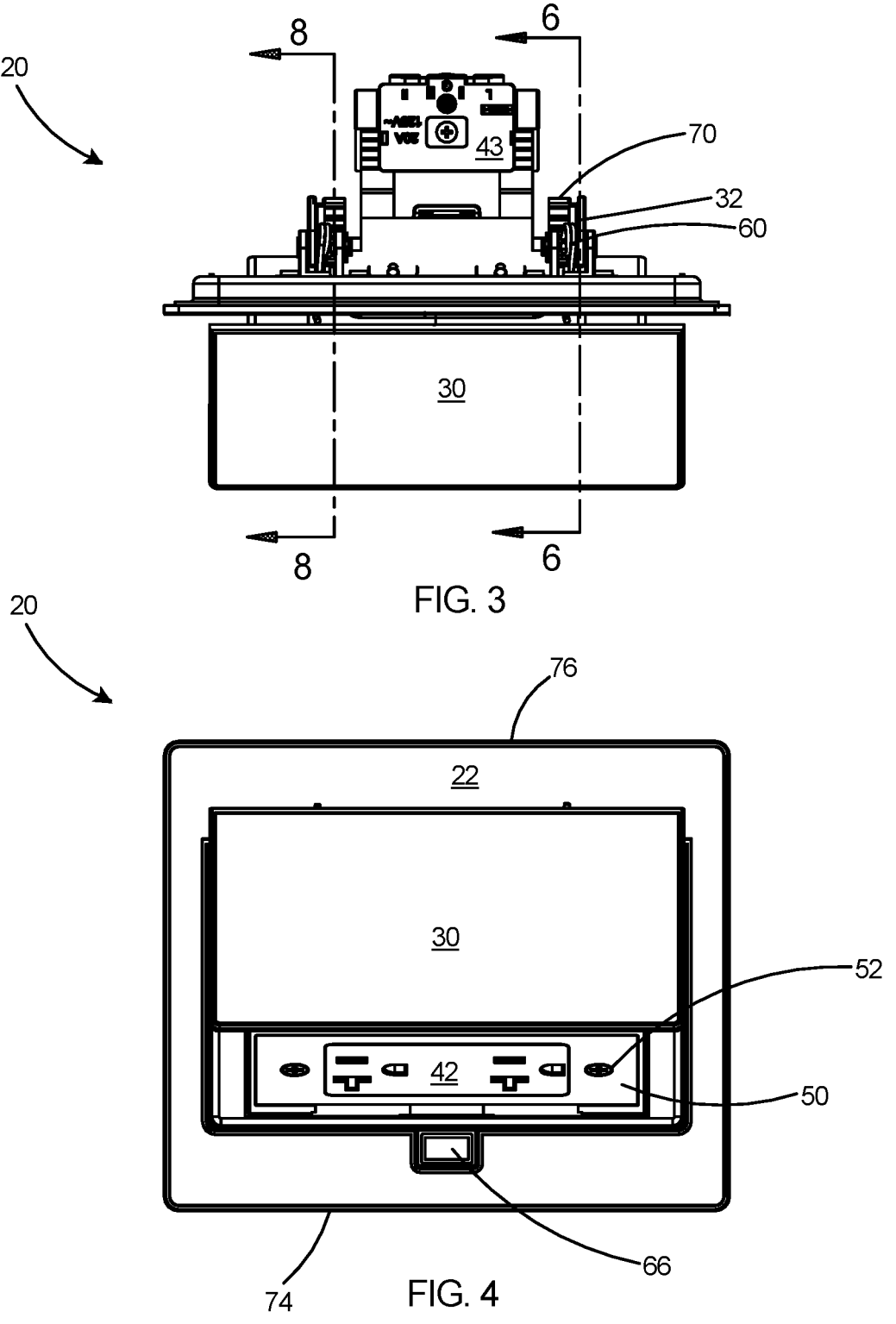
FIG. 3 is a rear view of the assembled pop-up cover and box kit with the cover plate open and the pre-wired leads extending from the front opening.
FIG. 4 is a top view of the pop-up with an installed duplex receptacle.

With reference to FIGS. 3 and 4, the pop-up cover assembly 20 includes a hinge pin 58 between the side plates 32 and two tension springs 60 to bias the lid 30 to the open configuration.

Referring to FIGS. 7-9, the spring clip 38 is mechanically connected to a latch 62, which in the closed configuration is urged by the spring clip 38 into a slot 64 on the floor plate (see FIG. 5) to lock the lid 30 and pop-up assembly 20 into the closed position. The actuator 66 on the floor plate 22 may be pressed to disengage the lid 30 from the closed configuration after which the lid will be released to the open configuration. A spring clip housing 68 (see FIG. 7) on the underside of the floor plate encloses the spring clip.

Two cog wheels 70 each work in conjunction with a corresponding cogged track 72 to control the track of the lid 30 with respect to the floor plate 22 to seat the lid 30 in the floor plate opening 24 and flush with the top surface of the floor plate when the lid is closed.

Figures 10, 11:
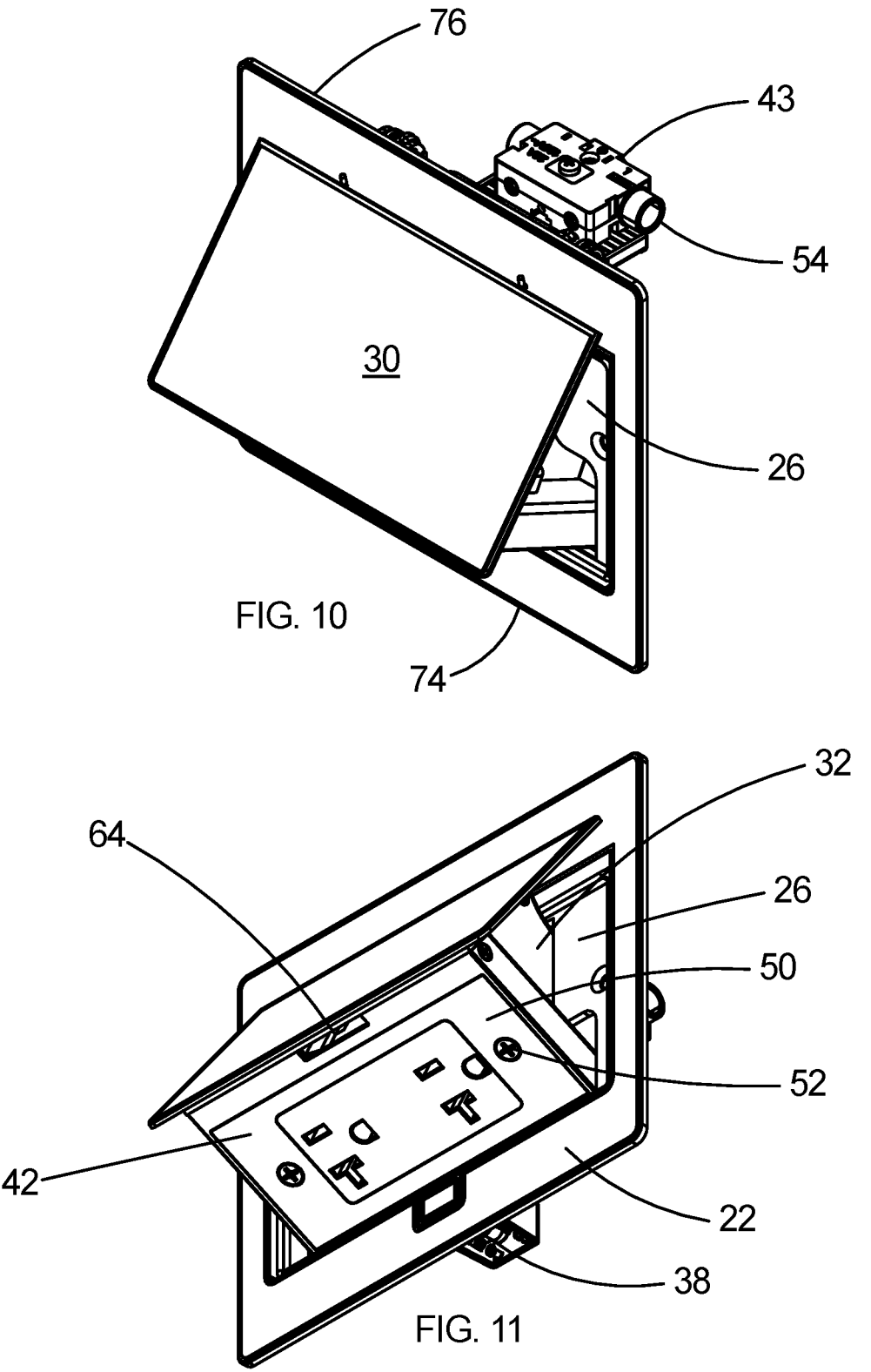
FIG. 10 is a rear perspective view of the pop-up cover.
FIG. 11 is a front perspective view of the pop-up cover from a different perspective than shown in FIG. 10.
Figure 12:
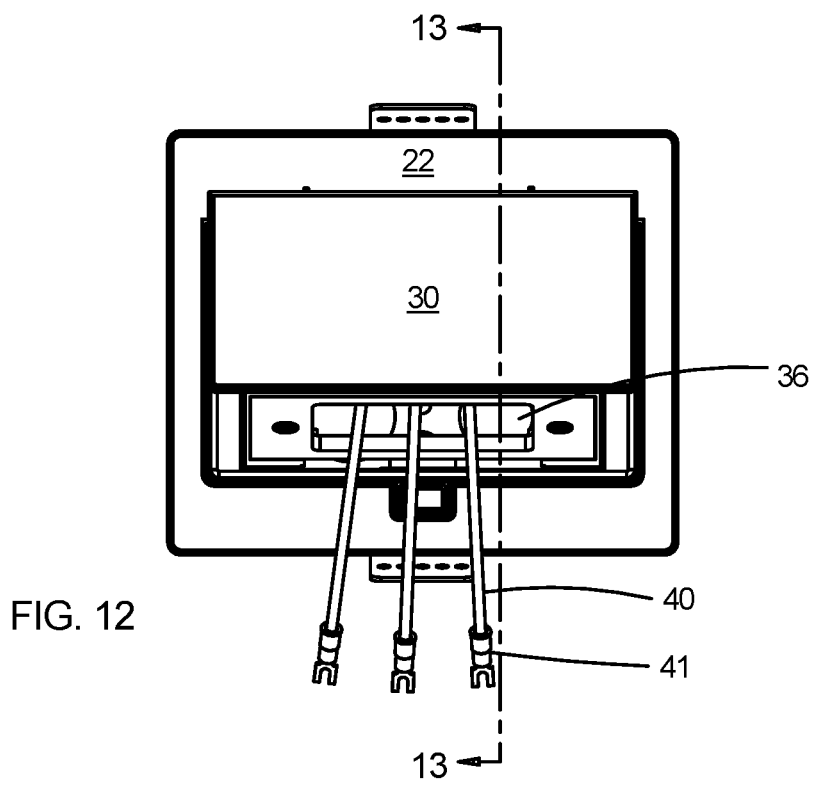
FIG. 12 is a top view of the pop-up cover and box kit according to the invention, with wiring leads extendable through the front opening for easy connection of a receptacle thereto.
Figure 13:
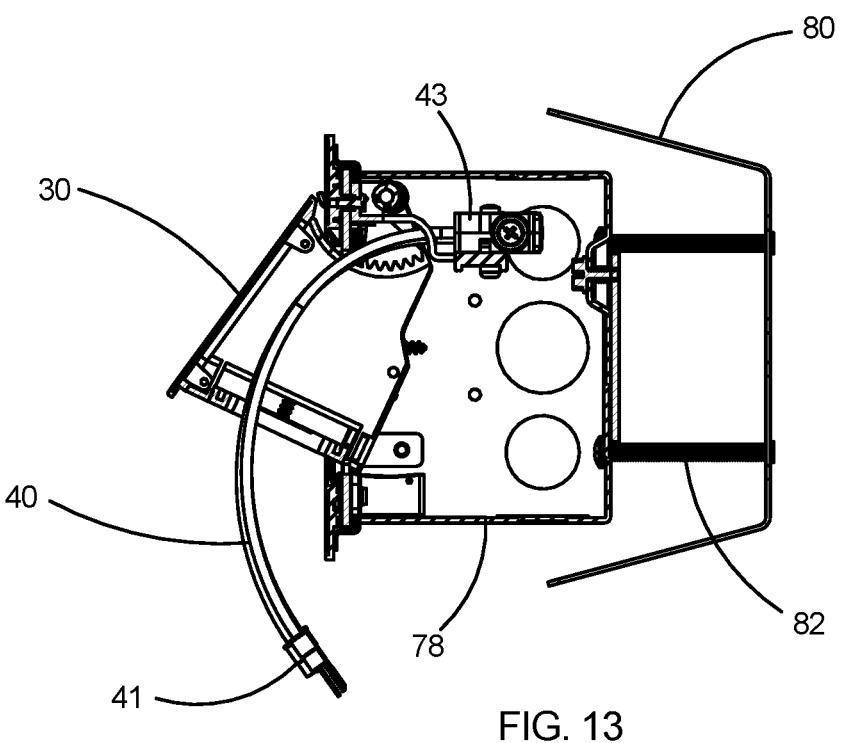
FIG. 13 is a sectional view of the pop-up cover and box kit taken along line 13-13 of FIG. 12.

With reference to FIGS. 10 and 11, the pop-up cover 20 is depicted in the open configuration with the lid 30 open from the floor plate 22. The floor plate 22 includes a front edge 74 and a rear edge 76, with the spring clip 38 situated on the underside of the floor plate 22 at the front edge 74 and the terminal block 43 situated on the underside of the floor plate 22 at the rear edge 74.

The pop-up cover is IP44 Rated (International Protection Marking) for Ingress Protection. The pop-up cover can be used to install an electrical device in a floor or countertop and enables secure mounting to any conventional steel box. The pop-up cover can be used to mount various UL listed receptacles, such as a tamper resistant, GFCI, or combo receptacle with two USB ports.

The pop-up cover kit preferably includes a 20A receptacle that can be used, or optionally replaced with one of your own. As the device is installed from the front, the kit makes it easy to install a receptacle. Just remove the white cover plate, install the receptacle and replace the cover plate. The covers close flush with the floor or countertop, preventing damage to the device in the box and minimizing trip hazards in a floor installation. The spring clip holds the box securely against the surface when the lid is closed. The pop-up cover can accommodate a standard rectangular receptacle, a GFCI, or a GFCI/combination receptacle. The pop-up cover also meets ingress protection codes and passes the scrub water test.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A pop-up cover and box kit comprising:
an electrical box including an enclosure;
a floor plate having an opening;
a pop-up cover hinged to said floor plate and movable from a closed configuration to an open configuration;
a front opening on said pop-up cover;
a terminal block on said pop-up cover;
wiring leads on said terminal block;
said wiring leads each having first ends connected to said terminal block;
said wiring leads on said terminal block in said open configuration extending from said first ends on said terminal block through said front opening of said pop-up cover; and
a spring clip biasing said pop-up cover to a normally open configuration.

2. The pop-up cover and box kit of claim 1, comprising:
a lid on said pop-up assembly; and
a latch to lock the lid and pop-up assembly into the closed configuration with the lid flush with the surrounding floor plate.

3. The pop-up cover and box kit of claim 2, comprising an actuator button on the floor plate to release the latch and change the pop-up cover from the closed configuration to the open configuration.

4. The pop-up cover and box kit of claim 1, comprising said wiring leads extending through said front opening of said pop-up cover each include a spade clip to ease connection to an electrical receptacle.

5. The pop-up cover and box kit of claim 1, comprising a hinge pin and hinge spring for hinging said pop-up cover assembly to said floor plate.

6. The pop-up cover and box kit of claim 4, comprising a recessed ledge on the periphery of the front opening the pop-up assembly.

\* \* \* \* \*